C. G. BESSE.
FLAT-IRON HEATER
No. 173,107.
Patented Feb. 8, 1876.
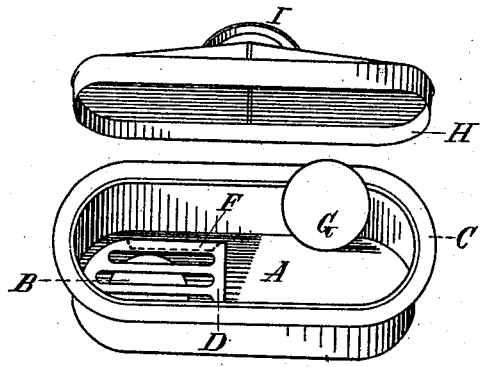

UNITED STATES PATENT OFFICE.

CHARLES G. BESSE, OF WILTON, MAINE.

IMPROVEMENT IN FLAT-IRON HEATERS.

Specification forming part of Letters Patent No. 173,107, dated February 8, 1876; application filed December 23, 1875.

*To all whom it may concern:*

Be it known that I, CHARLES G. BESSE, of Wilton, in the county of Franklin, State of Maine, have invented a certain new and useful Improvement in Sad-Iron Heaters, of which the following is a description sufficiently full, clear, and exact to enable any person skilled in the art or science to which my invention appertains to make and use the same, reference being had to the accompanying drawing, forming a part of this specification, in which—

Figure 1 is an isometrical perspective view.

My invention relates to that class of sad-iron heaters which are designed principally for domestic use; and consists in a novel construction and arrangement of the parts, as hereinafter more fully set forth and claimed, by which a simpler, cheaper, and more effective device of this character is produced than is now in ordinary use.

The nature and operation of my invention will be readily obvious to all conversant with such matter from the following description:

In the drawing, A represents the body of the heater, which is an oval vessel having vertical sides, provided with a laterally-projecting flange, C, at or near the top, and is, preferably, composed of cast-iron, or other metal of a similar material. The bottom of the heater near one of its ends is constructed with a circular opening, B, provided with the cover G. There is also a grate, D, having legs F, and arranged to be used over the opening, or in any other desired position. A sheet-metal cover, I, provided with the downwardly-projecting flange H, is fitted to close the body A when necessary, and in a manner which will be readily obvious without a detailed explanation.

In the use of my improvement the heater may be inserted in any ordinary cooking stove or range by removing two of the griddles and their connecting-plate, the flange C resting on the top of the stove. The irons to be heated may be placed on the grate over the opening B or directly on the bottom of the heater, as may be preferred. By removing the cover G a tea-kettle or any similar cooking utensil may also be inserted in the opening B.

It will be obvious that the cover I serves to retain the heat, and that by inserting the body of the heater directly into the fire-pot of the stove or range the irons will be heated more effectively and with less fuel than by the ordinary process.

I am aware that sad-iron heaters have heretofore been made with perforations throughout their bottoms, and have been provided with covers. These I do not claim, but What I do claim, and desire to secure by Letters Patent, is—

The heater A, provided with the opening B, grate D, and cover I, as set forth.

CHARLES G. BESSE. [L. S.]

Witnesses:
EBEN H. FARNUM,
E. W. JOHNSON.